United States Patent
Rodriguez

(12) United States Patent     (10) Patent No.: US 10,676,310 B2
    (45) Date of Patent:     Jun. 9, 2020

(54) TRANSPORTABLE ELECTRICAL WIRE DISPENSER

(71) Applicant: Arsenio Rodriguez, Akron, OH (US)

(72) Inventor: Arsenio Rodriguez, Akron, OH (US)

(*) Notice: Subject to any disclaimer, the term of this patent is extended or adjusted under 35 U.S.C. 154(b) by 127 days.

(21) Appl. No.: 16/106,446

(22) Filed: Aug. 21, 2018

(65) Prior Publication Data

US 2020/0062532 A1     Feb. 27, 2020

(51) Int. Cl.
    *B65H 49/32*     (2006.01)

(52) U.S. Cl.
    CPC ...... *B65H 49/321* (2013.01); *B62B 2202/025* (2013.01)

(58) Field of Classification Search
    CPC .. B65H 49/321; B65H 16/005; B65H 75/403; B62B 2202/025
    See application file for complete search history.

(56) References Cited

U.S. PATENT DOCUMENTS

| | | | | |
|---|---|---|---|---|
| 4,611,645 A | * | 9/1986 | Whisnant | B65H 49/321 242/129 |
| 6,182,920 B1 | * | 2/2001 | Watkins | B62B 3/022 242/594.4 |
| 2011/0121529 A1 | * | 5/2011 | Cabassa | B62B 3/104 280/47.35 |

* cited by examiner

*Primary Examiner* — William E Dondero
(74) *Attorney, Agent, or Firm* — Renner Kenner Law Firm

(57) ABSTRACT

An electrical wire dispenser includes a support member having a first distal end and a second distal end, a base member extending from the first distal end of the support member, the base member having a first distal end, a second distal end, and a bottom surface. The electrical wire dispenser further includes a first support member support leg coupled with the support member, a second support member support leg coupled with the support member, and a plurality of rods coupled with the support member. The electrical wire dispenser is moveable between an expanded first position particularly suitable for dispensing electrical wire from spools and a collapsed second position particularly suitable for transporting the dispenser.

20 Claims, 19 Drawing Sheets

TRANSPORTABLE ELECTRICAL WIRE DISPENSER

FIELD OF THE INVENTION

The present invention relates to a transportable electrical wire dispenser. The dispenser can be in an expanded first position particularly suitable for dispensing electrical wire from spools and in a collapsed second position particularly suitable for transporting the dispenser.

BACKGROUND OF THE INVENTION

Installation of electrical wire, such as in a new home, generally includes drilling holes through the foundation material and running electrical wire through the holes. To assist with running the electrical wire, the electrical wire may be wrapped around a spool, or roll, such that the spool can rotate to provide continuous dispensing of the wire.

The spools include a hole running through the middle such that the spools can be held on a rod. This allows the spools to be rotated for dispensing the electrical wire. Common techniques for holding electrical wire spools include constructing scaffolding or other large assemblies at a job site. This requires an installer to wait for the assembly to be built before beginning installation, which increases the installation time. Also, these built assemblies cannot be easily transported from one location to the next. Thus, there remains a need in the art for an improved electrical wire dispenser.

SUMMARY OF THE INVENTION

In a first embodiment, the present invention provides an electrical wire dispenser comprising a support member having a first distal end and a second distal end, a base member extending from the first distal end of the support member, the base member having a first distal end, a second distal end, and a bottom surface, a first support member support leg coupled with the support member, a second support member support leg coupled with the support member, and a plurality of rods coupled with the support member, wherein when the electrical wire dispenser is in a first expanded position, the support member, the first support member support leg, and the second support member support leg form a tripod shape, and at least a portion of the plurality of rods are substantially transverse with the support member to thereby hold electrical wire spools thereon and dispense electrical wire therefrom, wherein when the electrical wire dispenser is in a second collapsed position, the plurality of rods, the first support member support leg, and the second support member support leg are substantially parallel with the support member to thereby form the electrical wire dispenser in a compact shape for more easily transporting the electrical wire dispenser from a first location to a second location.

In a second embodiment, the present invention provides an electrical wire dispenser as in any of the above embodiments, the first support member support leg having a first distal end coupled with the support member and a second distal end having a caster, the second support member support leg having a first distal end coupled with the support member and a second distal end having a caster, the bottom surface of the base member having a pair of casters.

In a third embodiment, the present invention provides an electrical wire dispenser as in any of the above embodiments, wherein each of the casters are swivel casters capable of being locked in position, such that when the electrical wire dispenser is in the first expanded position and the casters are locked in position, the electrical wire dispenser is secured in place at a desired location to facilitate dispensing electrical wire without the dispenser moving undesirably.

In a fourth embodiment, the present invention provides an electrical wire dispenser as in any of the above embodiments, further comprising a first securement member between the first support member support leg and the support member, a second securement member between the second support member support leg and the support member, and a third securement member between the first support member support leg and the second support member support leg.

In a fifth embodiment, the present invention provides an electrical wire dispenser as in any of the above embodiments, wherein the first securement member and the second securement member are folding brackets and the third securement member is a tensioned rope.

In a sixth embodiment, the present invention provides an electrical wire dispenser as in any of the above embodiments, the second distal end of the support member including a handle extending therefrom.

In a seventh embodiment, the present invention provides an electrical wire dispenser as in any of the above embodiments, the bottom surface of the base member having a first base member support leg extending therefrom proximate the first distal end of the base member and a second base member support leg extending therefrom proximate the second distal end of the base member.

In an eighth embodiment, the present invention provides an electrical wire dispenser as in any of the above embodiments, the first base member support leg having a first caster of the pair of casters of the bottom surface of the base member, and the second base member support leg having a second caster of the pair of casters of the bottom surface of the base member.

In a ninth embodiment, the present invention provides an electrical wire dispenser as in any of the above embodiments, wherein when the electrical wire dispenser is in the first expanded position, at least a portion of the plurality of rods are substantially parallel with the support member, such that the at least a portion of the plurality of rods that are substantially transverse with the support member are thereby able to hold electrical wire spools having a larger diameter than when each of the plurality of rods are substantially transverse with the support member.

In a tenth embodiment, the present invention provides an electrical wire dispenser as in any of the above embodiments, wherein when the electrical wire dispenser is in the first expanded position, all of the plurality of rods are substantially transverse with the support member to thereby hold electrical wire spools on each of the plurality of rods.

In an eleventh embodiment, the present invention provides an electrical wire dispenser as in any of the above embodiments, the plurality of rods including two pairs of rods provided by a pair of upper rod assemblies.

In a twelfth embodiment, the present invention provides an electrical wire dispenser as in any of the above embodiments, wherein the pair of upper rod assemblies includes an uppermost rod assembly and a next-upper rod assembly, wherein the uppermost rod assembly includes a pair of brackets each having a cutout, the cutouts retaining the pair of rods of the next-upper rod assembly when the electrical wire dispenser is in the second collapsed position.

In a thirteenth embodiment, the present invention provides an electrical wire dispenser as in any of the above embodiments, the plurality of rods including two rods provided by a pair of lower rod assemblies.

In a fourteenth embodiment, the present invention provides an electrical wire dispenser as in any of the above embodiments, the support member including an upper surface, wherein the pair of upper rod assemblies are each spaced from the upper surface of the support member by a respective spacer.

In a fifteenth embodiment, the present invention provides an electrical wire dispenser as in any of the above embodiments, the plurality of rods including a rod provided by a lowest rod assembly, the lowest rod assembly including a guide bracket coupled with a rod, wherein the guide bracket is adapted to travel the lowest rod assembly between a first position corresponding with the first expanded position of the electrical wire dispenser and a second position corresponding with the second collapsed position of the electrical wire dispenser.

In a sixteenth embodiment, the present invention provides an electrical wire dispenser as in any of the above embodiments, wherein the rod of the lowest rod assembly is U-shaped having one shorter arm particularly coupled with the guide bracket and one longer arm for receiving an electrical wire roll.

In a seventeenth embodiment, the present invention provides an electrical wire dispenser as in any of the above embodiments, at least a portion of the plurality of rods including a tab at a distal end thereof for retaining an electrical spool placed on each of the at least a portion of the plurality of rods when the electrical wire dispenser is in the first expanded position.

In an eighteenth embodiment, the present invention provides an electrical wire dispenser as in any of the above embodiments, wherein any horizontal distance of the electrical wire dispenser is less than 36 inches.

In a nineteenth embodiment, the present invention provides an electrical wire dispenser as in any of the above embodiments, one of the first support member support leg and the second support member support leg including a locking bar rotatable between a first locking position for retaining the electrical wire dispenser in the second collapsed position and a second unlocking position for allowing the electrical wire dispenser to travel between the second collapsed position and the first expanded position.

In a twentieth embodiment, the present invention provides an electrical wire dispenser as in any of the above embodiments, further comprising a first securement member between the first support member support leg and the support member and a second securement member between the second support member support leg and the support member, wherein the locking bar has a generally rectangular shape with one rounded corner, wherein the rounded corner contacts a respective one of the first securement member and the second securement member for retaining the electrical wire dispenser in the second collapsed position.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

One or more embodiments of the present invention provide an electrical wire dispenser. Advantageously, the electrical wire dispenser may be easily transportable between locations. The electrical wire dispenser may also be secured in place at a desired location to facilitate dispensing electrical wire without the dispenser moving undesirably. The electrical wire dispenser may be positionable in an open position, particularly suitable for dispensing electrical wire from spools positioned on the dispenser, and positionable in a closed position, particularly suitable for transporting the dispenser.

Figure 1:
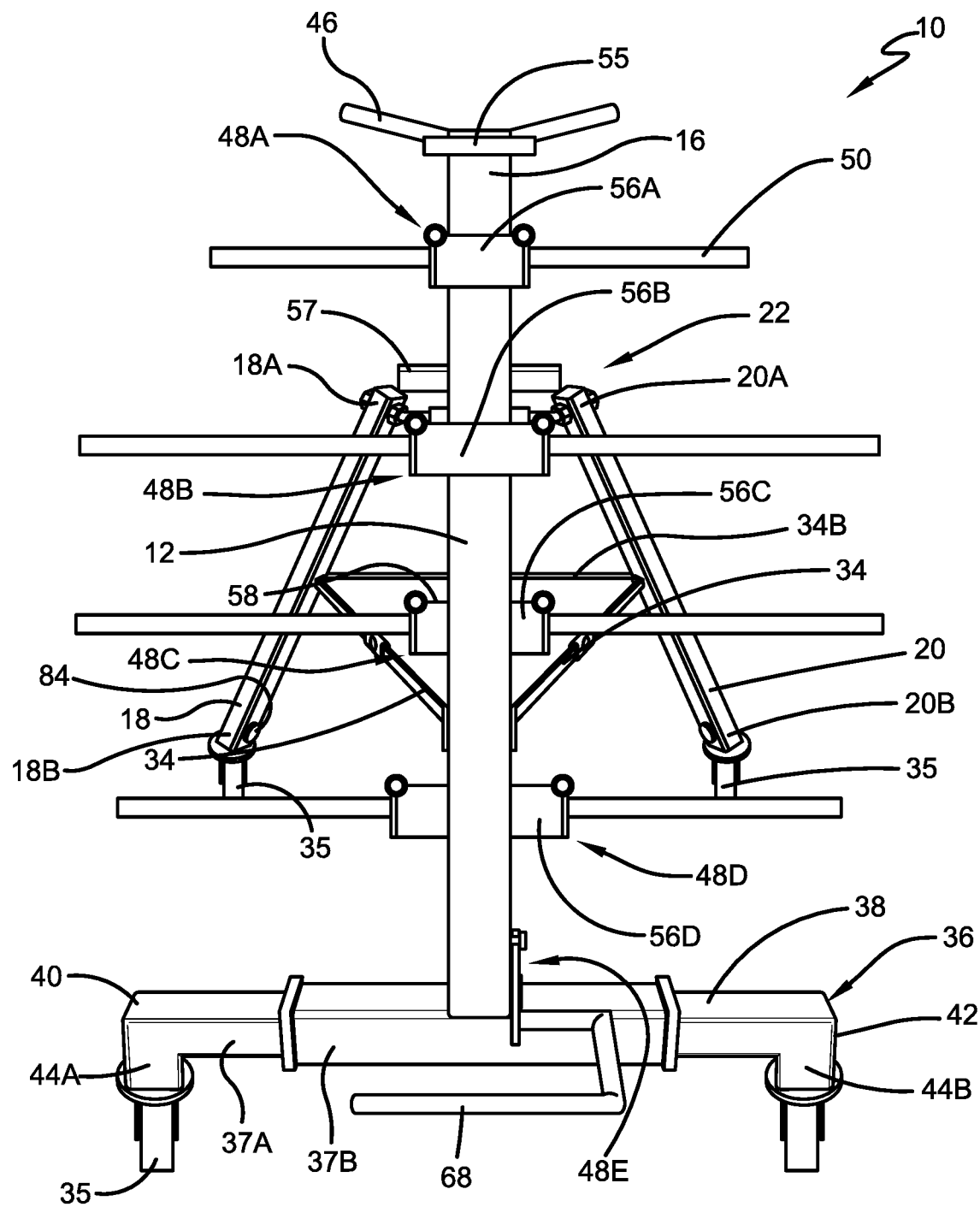
FIG. 1 is a perspective view of a transportable electrical wire dispenser according to the concepts of the present invention, showing a front view of the transportable electrical wire dispenser in an open position.

With reference to the figures, a transportable electrical wire dispenser according to the concepts of the present invention is generally indicated by the numeral 10. FIG. 1 shows electrical wire dispenser 10 in an open position, which may also be described as an expanded position. Electrical wire dispenser 10 includes a support member 12 having a first distal end 14 and a second distal end 16. A first support leg 18 and a second support leg 20, which may be described as angular support legs, are coupled with support member 12, which coupling may be by way of a support assembly 22. Support member 12, first support leg 18, and second support leg 20 may be shaped as rectangular prisms and may be made from any suitable material such as metal.

Figure 13:
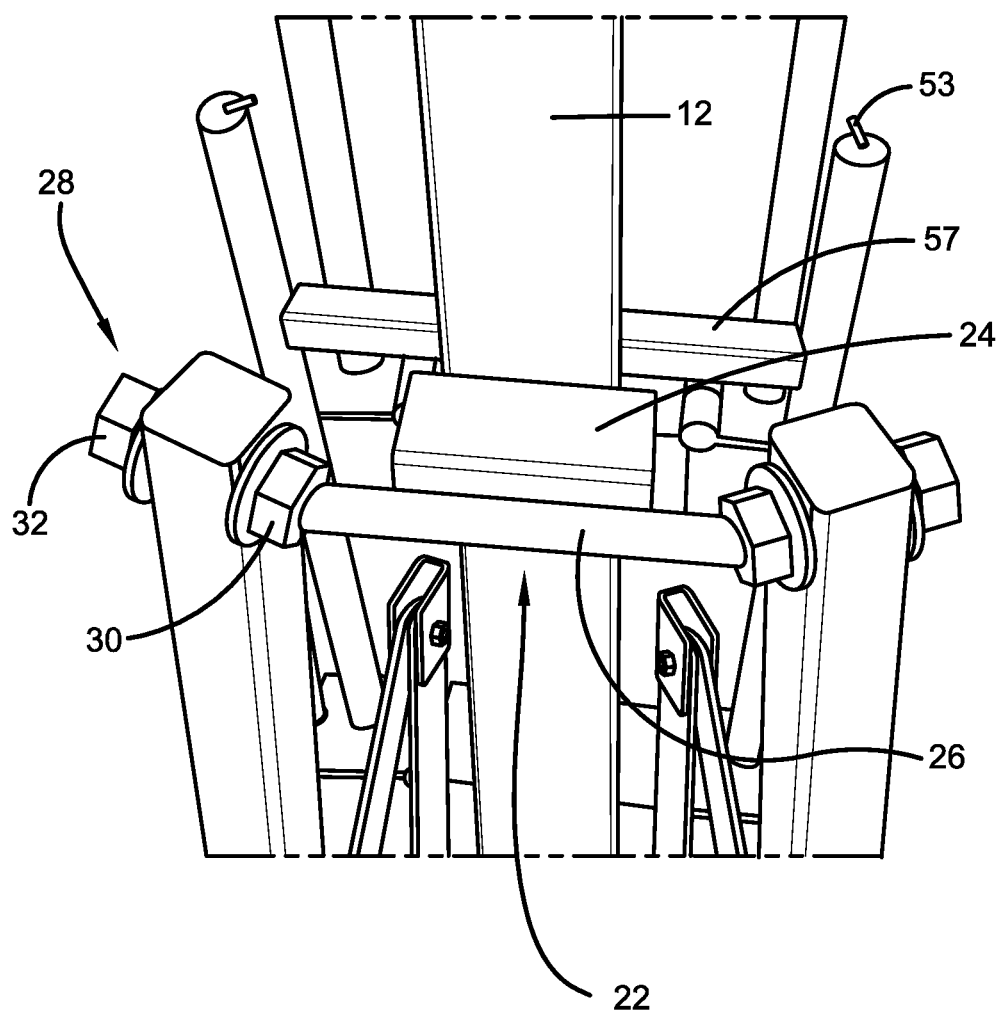
FIG. 13 is a perspective view of a support assembly of the transportable electrical wire dispenser.

As best seen in FIG. 13, support assembly 22 may include a spacing block 24 to space a rod or bolt 26 away from support member 12. First support leg 18 and a second support leg 20 are each coupled at a first end 18A, 20A thereof with support member 12 at each end of rod 26, which may be by way of any suitable hinge. An exemplary hinge 28 includes a first nut 30 that is threaded with a rod or bolt (not seen) extending through a respective one of first support leg 18 and second support leg 20. First nut 30 is secured to rod 26, such as by welding. The other end of the rod or bolt extending through a respective one of first support leg 18 and second support leg 20 includes a second nut 32 for securing the respective one of first support leg 18 and second support leg 20 in position.

First support leg 18 and second support leg 20 are not fixedly secured with respect to the respective rod extending therethrough such that first support leg 18 and second support leg 20 are rotatable about the respective rod in order to move electrical wire dispenser 10 between positions. The degree of rotation of first support leg 18 and second support leg 20 about the respective rod may be limited by securement members 34 between first support leg 18 and support member 12 and between second support leg 20 and support member 12. A securement member 34B may also be present between first support leg 18 and second support leg 20. Securement members 34 are shown as folding brackets and securement member 34B is shown as a tensioned wire rope, though any of securement members 34, 34B may be any suitable securement members such as folding brackets, hinges, wire rope, and chain links.

First support leg 18 and second support leg 20 may have respective second distal ends 18B, 20B which each include a caster 35. Casters 35 are provided for easy transport of electrical wire dispenser 10 from one location to another. Suitable casters 35 are generally known to those skilled in the art. In one or more embodiments, casters 35 may be swivel casters capable of being locked in position. The ability to lock in position is advantageous for dispensing electrical wire. When electrical wire dispenser 10 is in the expanded position and casters 35 are locked in position, electrical wire dispenser 10 is secured in place at a desired location, which facilitates dispensing electrical wire without electrical wire dispenser 10 moving undesirably. In one or more embodiments, the wheels of casters 35 may be made from a material that is able to easily roll over objects and will also not be punctured. Suitable materials are generally known to those skilled in the art. An exemplary material for the wheels of casters 35 is thick rubber with an inner support foam.

Electrical wire dispenser 10 further includes a base member 36 having a top surface 38 secured to first distal end 14 of support member 12. Base member 36 further includes a first distal end 40, a second distal end 42, and a bottom surface (not seen). Base member 36 may be shaped as a rectangular prism and may be made from any suitable material such as metal. Base member 36 may be any suitable length for providing sturdiness to electrical wire dispenser 10. In one or more embodiments, base member 36 may be 18 inches long, or approximate thereto, in other embodiments, 20 inches long, or approximate thereto.

Figure 15:
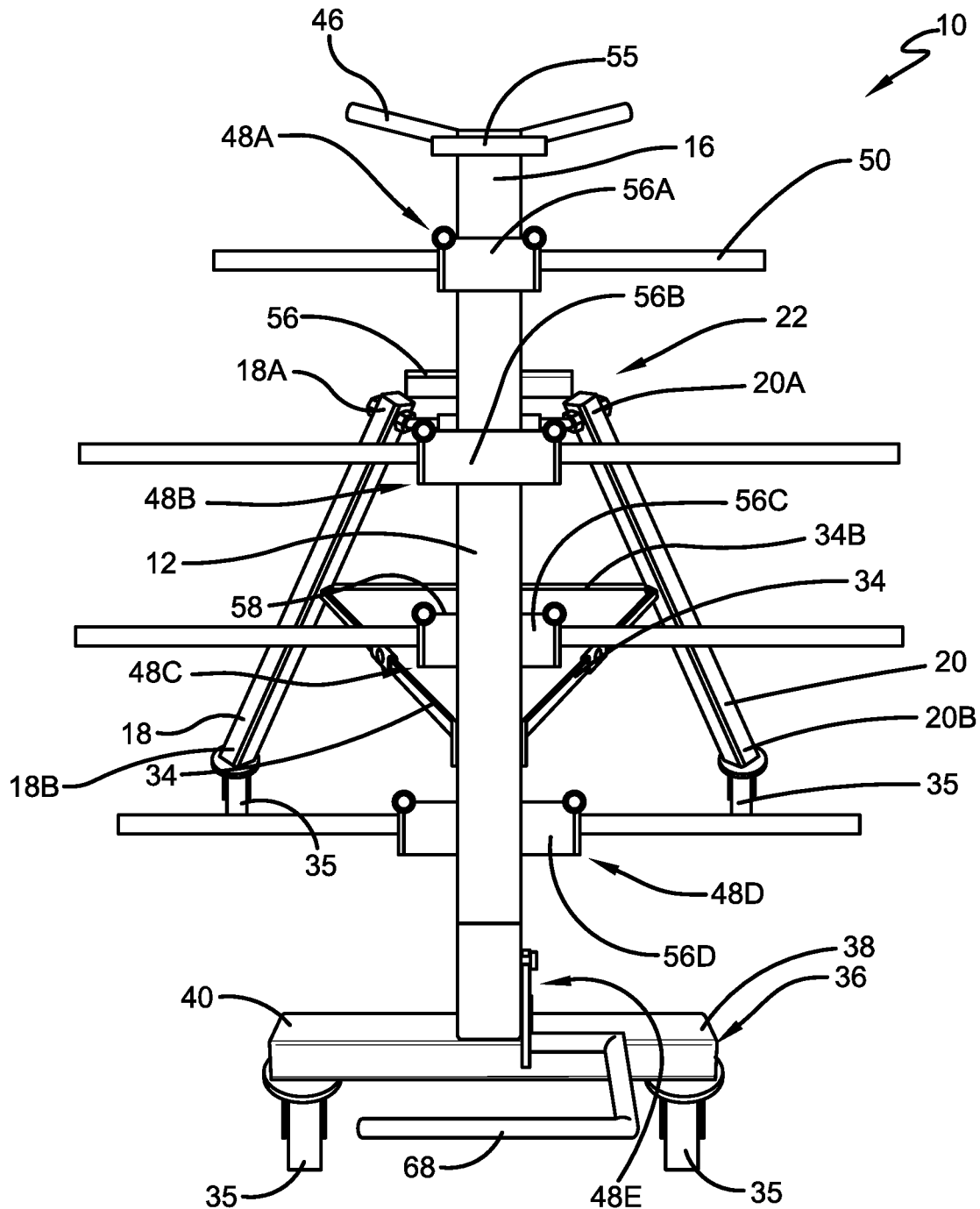
FIG. 15 is a perspective view of the transportable electrical wire dispenser according to the concepts of the present invention, showing a front view of the transportable electrical wire dispenser in an open position, with the base member shown without the optional slide blocks and without the optional support legs.
Figure 16:
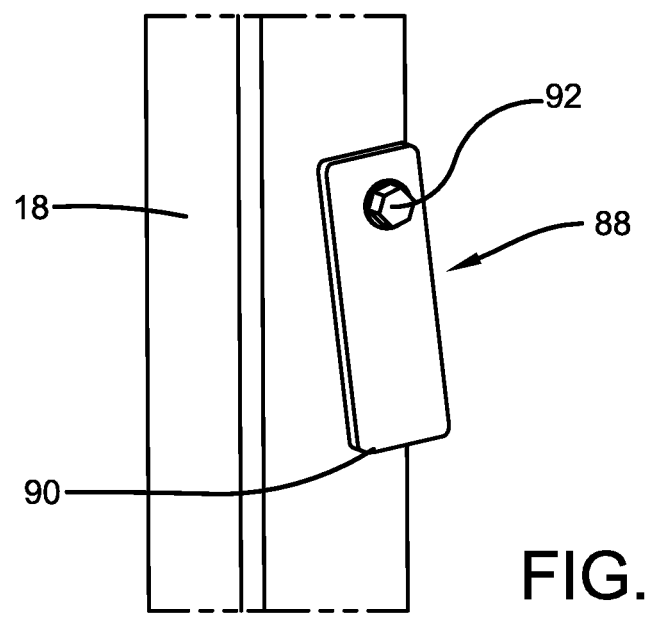
FIG. 16 is a perspective view of a lock for securing the support legs in place.

In one or more embodiments, as shown in FIG. 15, base member 36 may be a single unitary member. Base member 36 as a single unitary member may be hollow or solid.

In one or more embodiments, base member 36 may be made from an inner component 37B and an outer component 37A. A portion of inner component 37B may be hollow for receiving a portion of outer component 37A. Outer component 37A may be retainable in an inner position for a more compact shape of electrical wire dispenser 10, and retainable in an outer position for additional length of base member 36 for additional support of electrical wire dispenser 10. For traveling outer component 37A from an inner position to an outer position, a slide block (not seen) may be utilized within inner component 37B to prevent scratching the outer component 37B when traveling between positions.

In one or more embodiments, base member 36 may include a support leg 44A extending from the bottom surface of base member 36 proximate first distal end 40 of base member 36, and a support leg 44B extending from the bottom surface of base member 36 proximate second distal end 42 of base member 36. Where present, support legs 44A, 44B may include a respective caster 35. Where support legs 44A, 44B are not present, as shown in FIG. 15, the respective casters 35 may be coupled directly with the bottom surface of base member 36. As mentioned above, suitable casters 35 are generally known to those skilled in the art. In one or more embodiments, casters 35 of base member 36 may be swivel casters capable of being locked in position. In one or more embodiments, the wheels of casters 35 may be made from a material that is able to easily roll over objects and will also not be punctured. Suitable materials are generally known to those skilled in the art. An exemplary material for the wheels of casters 35 is thick rubber with an inner support foam.

Electrical wire dispenser 10 may further include one or more handles 46 secured to second distal end 16 of support member 12. One or more handles 46 may include two linearly extending handles, as shown in the figures, or may include a single circular or generally circular handle.

Support member 12 further includes a plurality of rod assemblies 48A, 48B, 48C, 48D, 48E coupled with support member 12. As will be further described herein, rod assemblies 48A, 48B, 48C, 48D, 48E are adapted to receive electrical wire spools for dispensing electrical wire. Rod assemblies 48A, 48B may be characterized as upper rod assemblies, rod assemblies 48C, 48D may be characterized as lower rod assemblies, and rod assemblies 48E may be characterized as a lowest rod assembly. Rod assembly 48A may be characterized as an uppermost rod assembly or upper-upper rod assembly and rod assembly 48B may be characterized as a next-upper rod assembly or lower-upper rod assembly. Rod assembly 48C may be characterized as an upper rod assembly of the lower rod assemblies or upper-lower rod assembly and rod assembly 48D may be characterized as a next-lower rod assembly or lower-lower rod assembly.

Each rod assembly 48A, 48B, 48C, 48D includes a rod 50 retained by a bracket 52. Rods 50 may be of any suitable length and made from any suitable material, such as metal. In one or more embodiments, rods 50 may include a tab 53 at a distal end thereof for retaining an electrical spool from sliding off the rods 50. A user may lift the hole of the electrical spool over the tab in order to place the electrical spool on the rods 50, with the tab then block the hole of the electrical spool from traveling off the rods 50.

Figure 12:
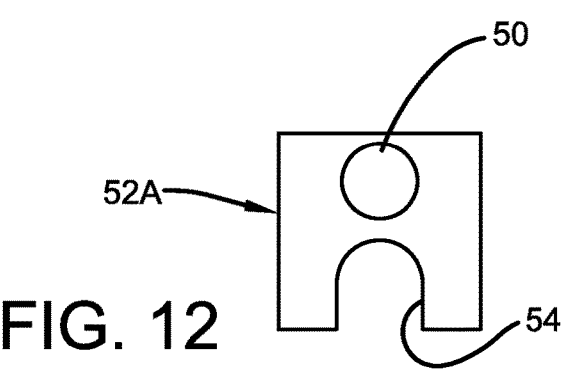
FIG. 12 is a top plan view of a rod-retaining bracket of a rod assembly of the transportable electrical wire dispenser.

Rods 50 extend from a planar face of brackets 52. Rods 50 may be welded to brackets 52 or secured by any another suitable means. Certain of the brackets may be provided as brackets 52A for receiving a lower rod 50, as best seen in FIG. 12. Brackets 52A include a cutout 54 for positioning a portion of lower rod 50 therein.

Figure 7:
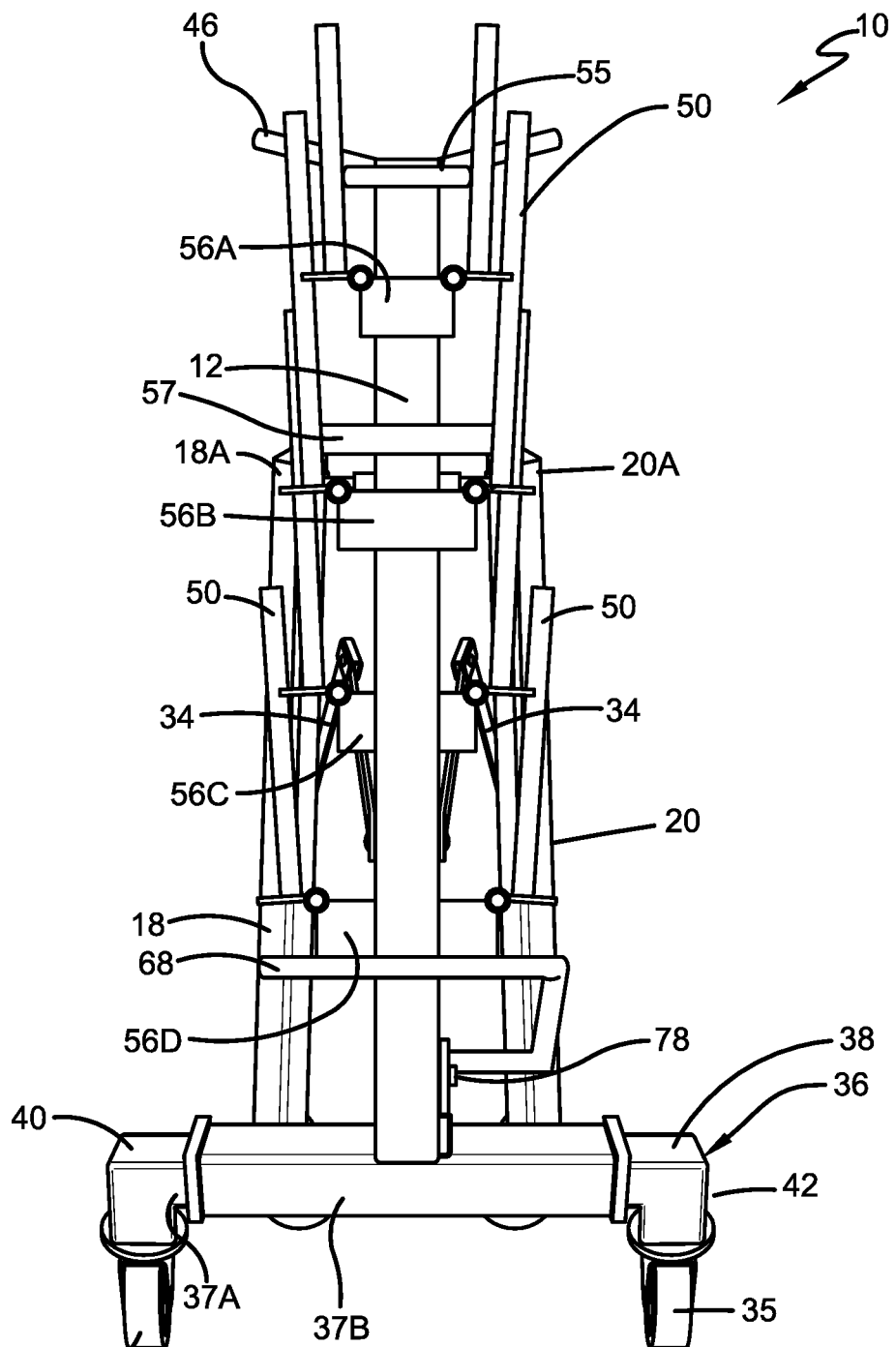
FIG. 7 is a perspective view of the transportable electrical wire, showing a front view of the transportable electrical wire dispenser in a closed position.
Figure 9:
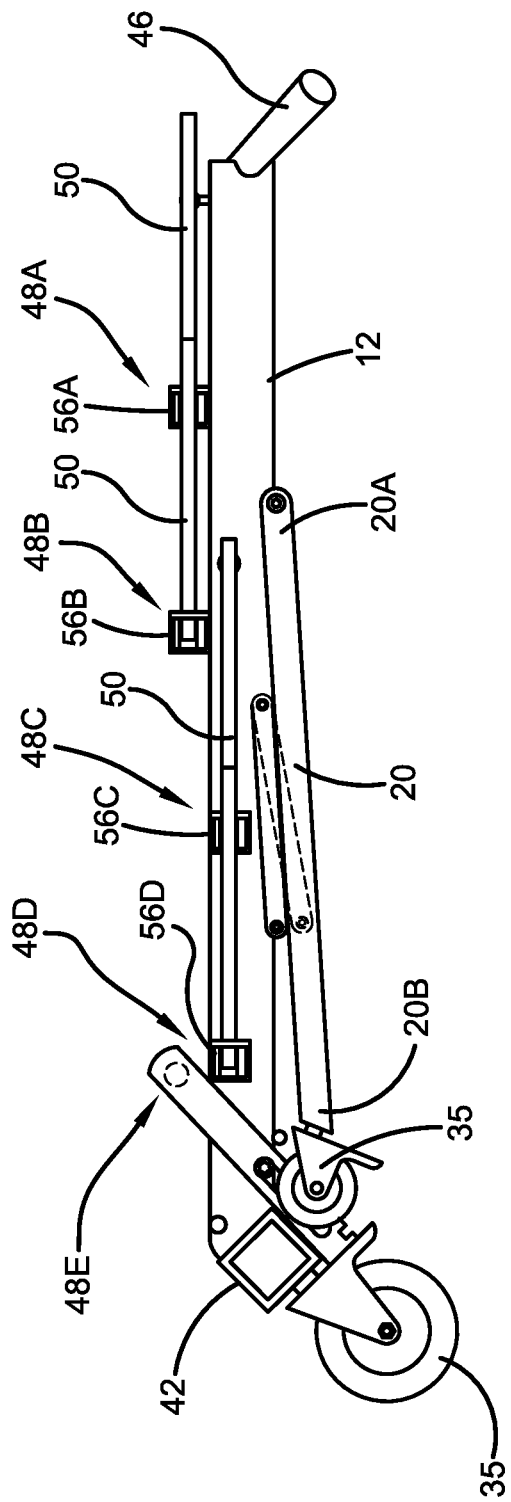
FIG. 9 is a side elevational view of the transportable electrical wire dispenser in a closed position.
Figure 10:
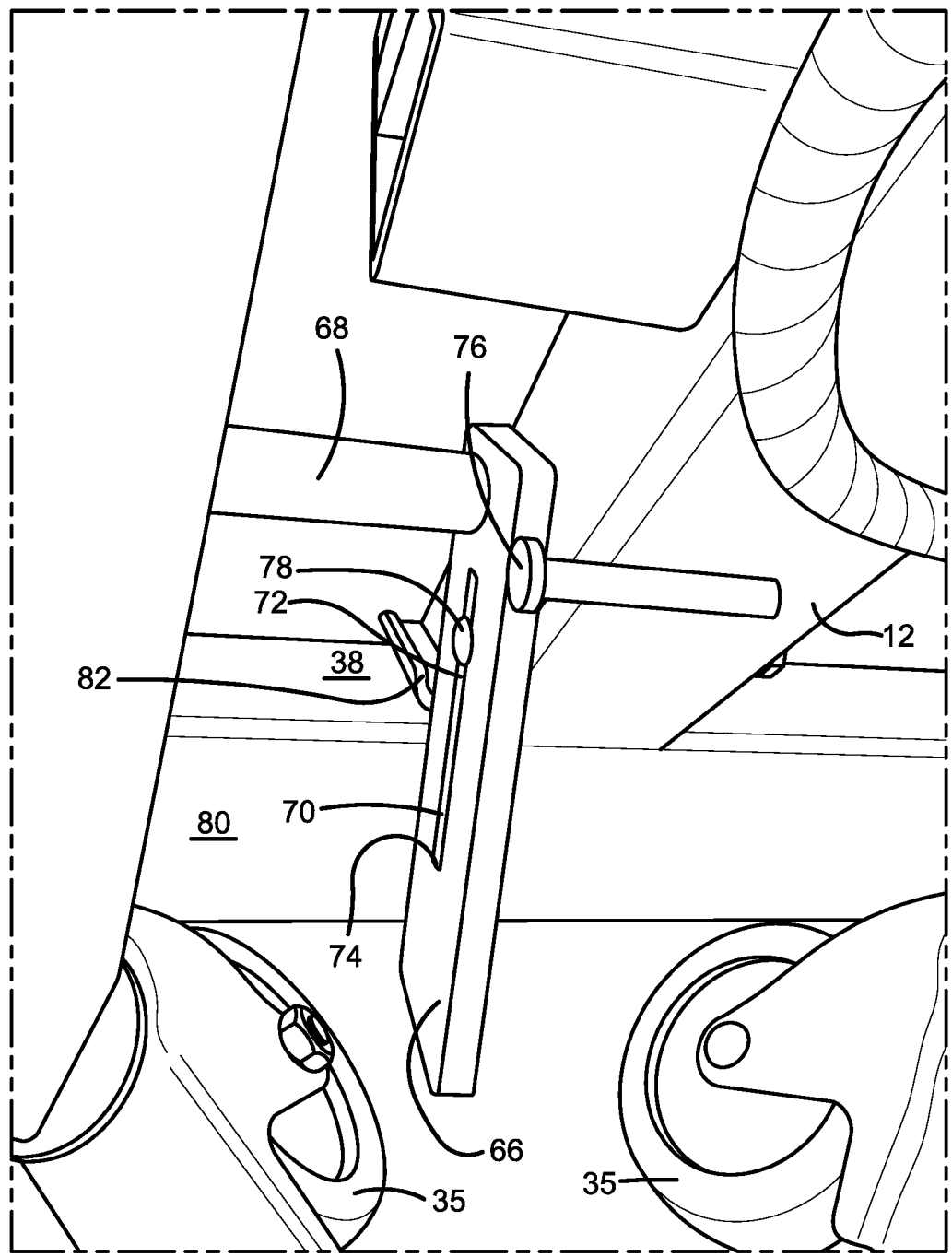
FIG. 10 is a perspective view of a lowest rod assembly of the transportable electrical wire dispenser.

In one or more embodiments, rod assembly 48A and rod assembly 48C are provided with brackets 52A. As seen in FIG. 7 and FIG. 9, rod 50 of rod assembly 48B fits within cutout 54 of bracket 52A of rod assembly 48A and rod 50 of rod assembly 48D fits within cutout 54 of bracket 52A of rod assembly 48C. Thus, when electrical wire dispenser 10 is in a collapsed position, rod 50 of rod assembly 48B and rod 50 of rod assembly 48D may more closely match the position of support member 12 and are more secure in place. In one or more embodiments, the perimeter of cutout 54 may be made from a magnetic material or cutout 54 may include one or more magnets for further securement of rods 50.

Electrical wire dispenser 10 may include a rod securing bar 55 made from a magnetic material or including one or more magnets for securing rods 50 of rod assembly 48A. Electrical wire dispenser 10 may include a rod securing bar 57 made from a magnetic material or including one or more magnets for securing rods 50 of rod assembly 48C.

Each rod assembly 48A, 48B, 48C, 48D may be spaced from support member 12 by a respective spacer 56A, 56B, 56C, 56D. Upper spacers 56A, 56B are positioned on a top surface of support member 12 and lower spacers 56C, 56D are positioned on side surfaces of support member 12. As seen in FIG. 9, this enables rods 50 of rod assembly 48A and rod assembly 48B to fold to a position that is in front of support member 12 and rods 50 of rod assembly 48C and rod assembly 48D to fold to a position that is alongside of support member 12. Thus, all rods 50 can be moved between the positions transverse, or substantially transverse, support member 12 and the positions parallel, or substantially parallel, support member 12 without interference from another rod 50.

As seen in FIG. 1, spacer 56B may have a length longer than spacer 56A and spacer 56D may have a length longer than spacer 56C. This further allows movement of rods 50 between positions without interference from another rod 50.

Spacers 56A, 56B, 56C, 56D can be coupled with a respective rod 50 by way of a hinge 58, which facilitates movement of rods 50 between positions. To provide extra strength to hinges 58, spacers 56A, 56B, 56C, 56D may include a pinning receptacle 60 adapted to receive a pinning block 62 carried by a respective bracket 52, 52A. Pinning block 62 may be shaped as a rectangular prism and pinning receptacle 60 may be shaped with a hole 64 matching, or approximately matching, the shape of pinning block 62. Thus, when rod assemblies 48A, 48B, 48C, 48D are positioned with rods 50 in a transverse, or electric wire roll receiving, position, pinning block 62 is positioned within hole 64 of pinning receptacle 60. Movement of pinning block 62 is thereby prevented from side-to-side, thereby increasing the strength of rod assemblies 48A, 48B, 48C, 48D. In one or more embodiments, hinges 58 may be spring loaded, such that the spring force maintains hinges 58 and rods 50 in a closed position, with the weight of one or more electrical spools overcoming the spring force to place hinges 58 and rods 50 in an open position.

Figure 20:
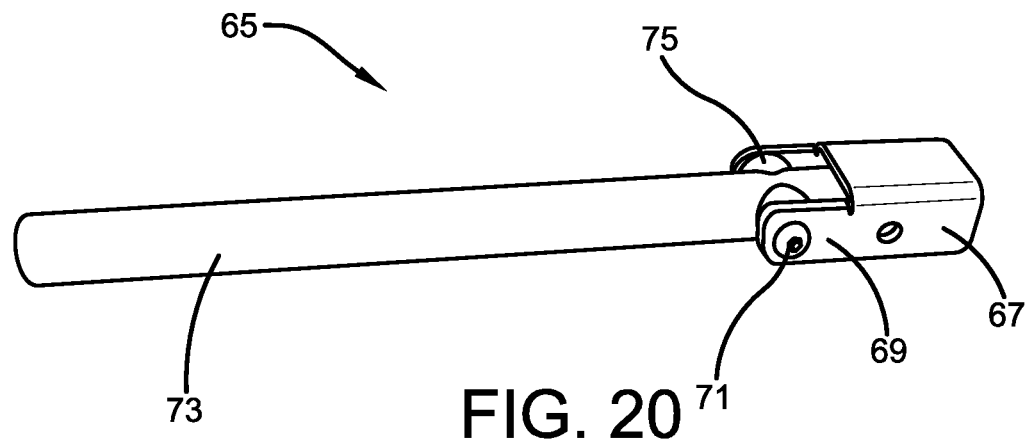
FIG. 20 is a perspective view of an alternative rod assembly, showing the open position.
Figure 21:
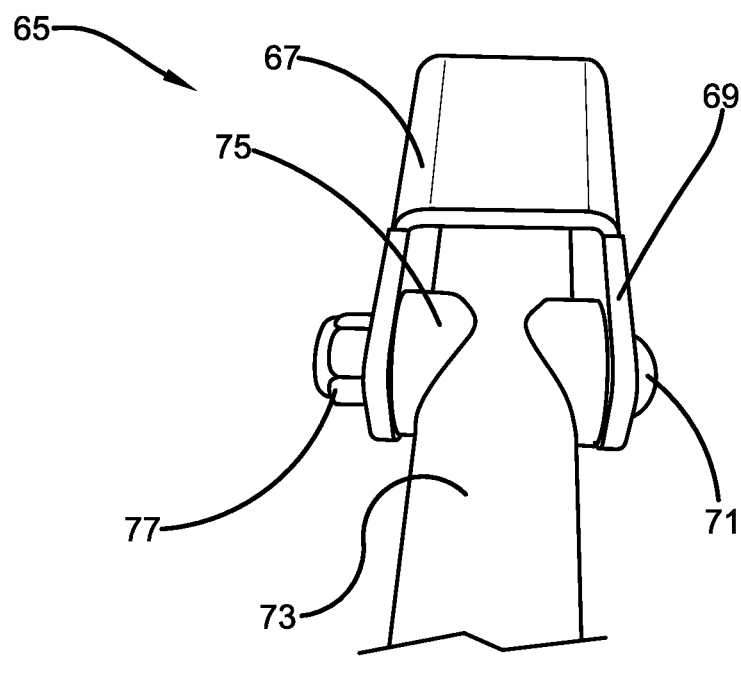
FIG. 21 is a perspective view of the alternative rod assembly, showing the open position.
Figure 22:
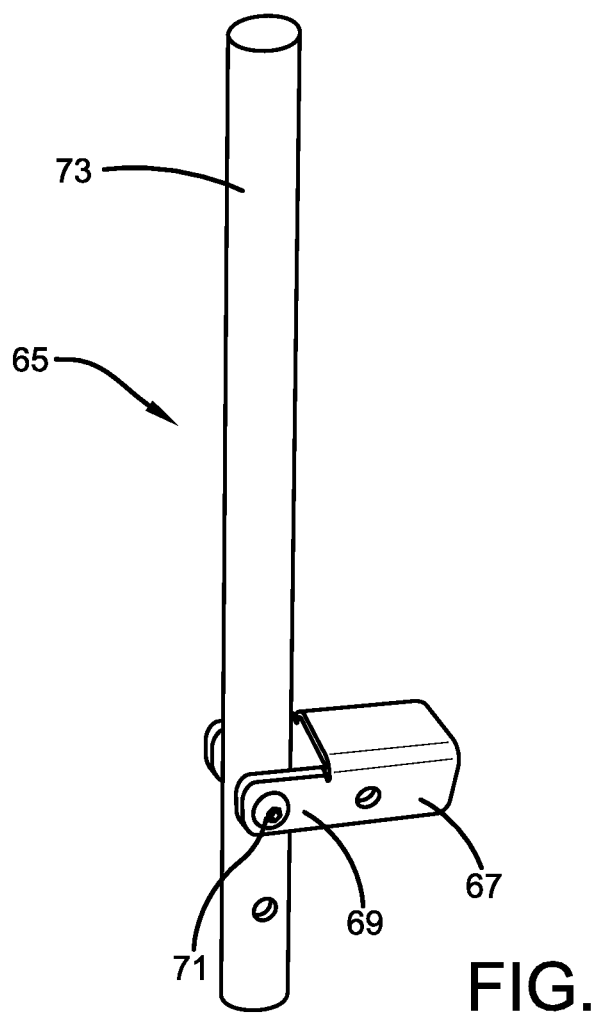
FIG. 22 is a perspective view of the alternative rod assembly, showing the closed position.

An alternative rod assembly 65 is shown in FIGS. 20-22. Rod assembly 65 may be used in place of one or more of rod assemblies 48A, 48B, 48C, 48D. In one or more embodiments, rod assembly 65 may be used in place of each of rod assemblies 48A, 48B, 48C, 48D. It should be appreciated that in embodiments where rod assembly 65 is utilized, certain features described above are retained for suitable operation of electrical wire dispenser 10. For example, where rod assembly 65 is utilized, spacers 56A, 56B, 56C, 56D would retain their respective positions on support member 12, and would retain their respective lengths (that is, spacer 56B may have a length longer than spacer 56A and spacer 56D may have a length longer than spacer 56C).

Rod assembly 65 includes a spacer having a spacer body 67 and a pair of spacer ears 69. Spacer ears 69 receive a bolt 71 therethrough, with the bolt 71 carrying a rod 73. Rod assembly 65 may include a pair pinning members 75 with each pinning member 75 positioned between rod 73 and a respective one of the pair of spacer ears 69. Bolt 71 and a respective nut 77 secure rod 73 in place but allow rod 73 to rotate from a first expanded position (FIG. 20) transverse, or substantially transverse, support member 12 to a second closed position (FIG. 22) parallel, or substantially parallel, support member 12. In the first expanded position, an end of rod 73 may contact spacer body 67 to prevent further travel and to provide further support for receiving an electrical spool on rod 73.

Lowest rod assembly 48E includes a guide bracket 66 coupled with a rod 68. Guide bracket 66 includes a channel 70 for traveling about a pin 72 retained by support member 12. Rod 68 which is U-shaped with one shorter arm coupled with guide bracket 66 and one longer arm for receiving an electrical wire roll. The coupling of rod 68 with guide bracket 66 may be by welding or any other suitable form.

Figure 3:
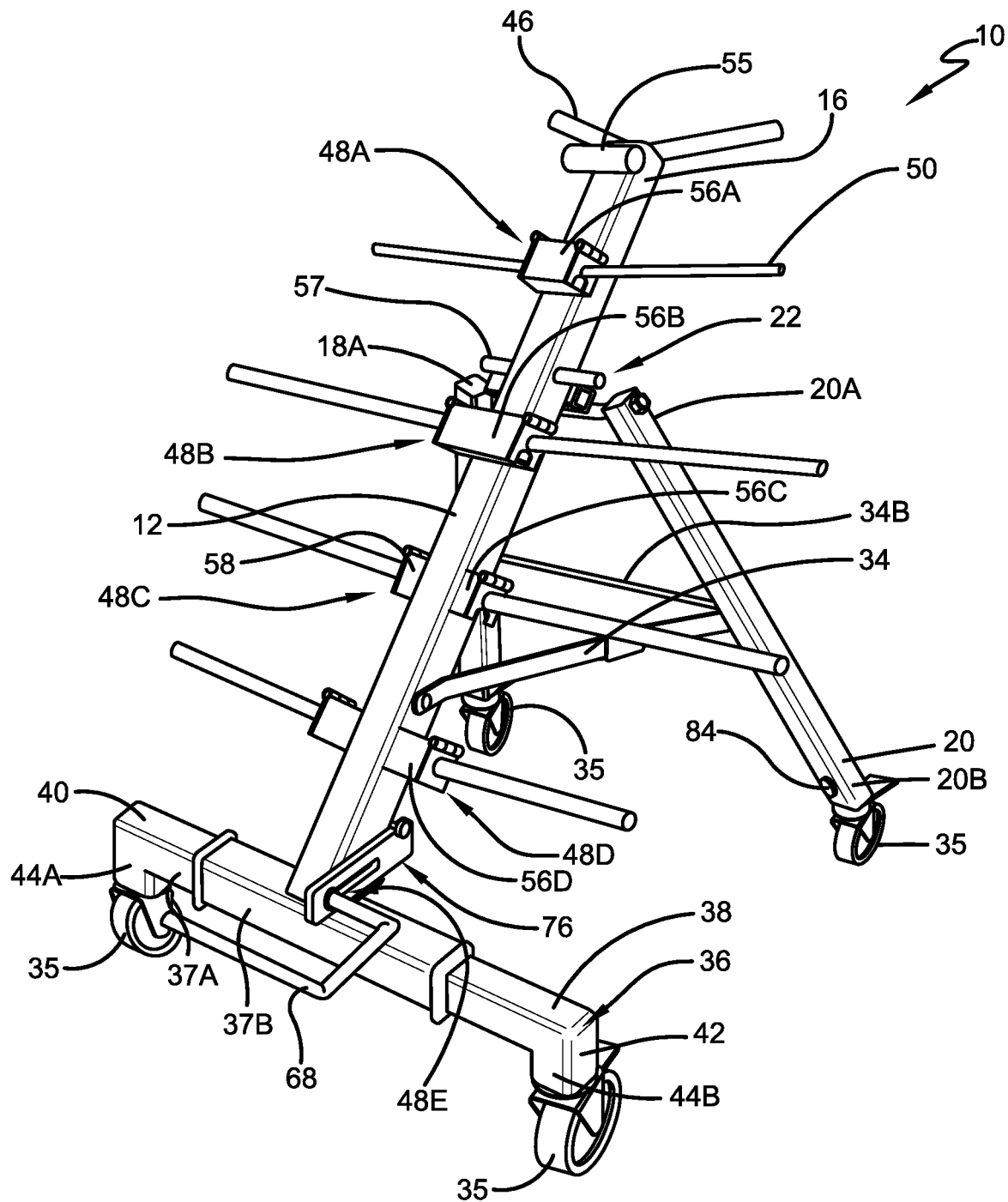
FIG. 3 is a perspective view of the transportable electrical wire dispenser in an open position.
Figure 4:
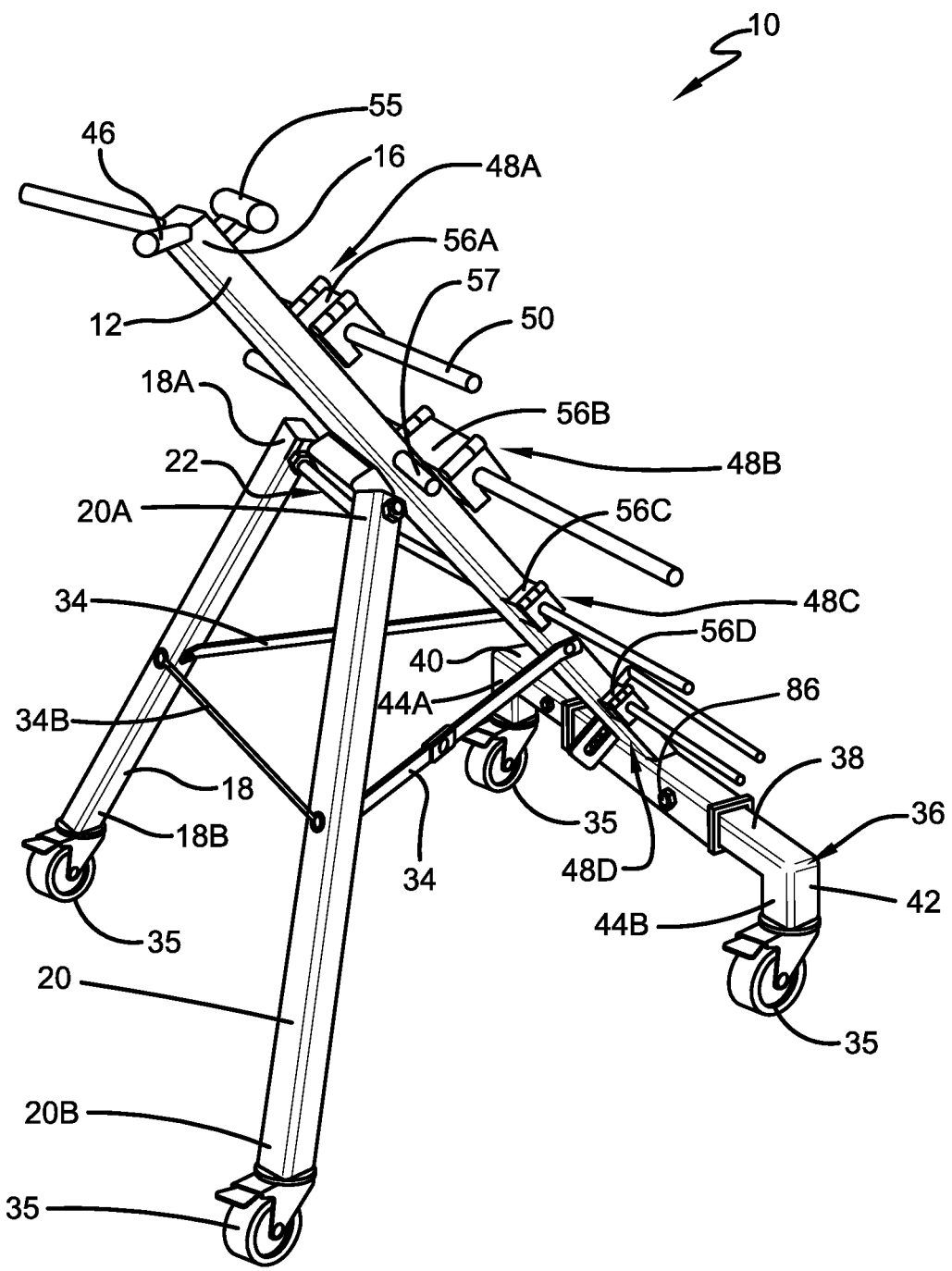
FIG. 4 is a perspective view of the transportable electrical wire dispenser in an open position.

FIG. 3 shows lowest rod assembly 48E in a position for receiving an electrical wire roll. Guide bracket 66 travels about pin 72 such that pin 72 is at or near a first end 74 of channel 70 and guide bracket 66 is parallel, or substantially parallel, with the ground. With the presence of the weight from an electrical wire roll on the longer arm of pin 72, the weight is supported and guide bracket 66 is prevented from rotation based on guide bracket 66 contacting a guide channel 82 or by guide bracket 66 directly contacting the top surface 38 of base member 36. The weight may be further supported and guide bracket 66 may be further prevented from rotation by contacting a pin 76 retained by support member 12.

To move lowest rod assembly 48E to a collapsed position, guide bracket 66 travels about pin 72 such that pin 72 is at or near a second end 78 of channel 70 and guide bracket 66 is parallel, or substantially parallel, with a rear surface 80 of base member 36. Rear surface 80 may include one or more magnets for magnetic securement of guide bracket 66 in the collapsed position of lowest rod assembly 48E.

As mentioned above, electrical wire dispenser 10 can be moved between an expanded position and a collapsed position. In the expanded position of electrical wire dispenser 10, support member 12, first support leg 18, and second support leg 20 form a tripod shape. In the expanded position of electrical wire dispenser 10, at least a portion of rods 50 may be positioned transverse, or substantially transverse, with support member 12 to thereby hold electrical wire spools thereon. First support leg 18 and second support leg 20 may be any suitable length for providing sturdiness to electrical wire dispenser 10 in the expanded position of electrical wire dispenser 10.

As shown in FIG. 1, electrical wire dispenser 10 may be positioned such that all of rods 50 are transverse, or substantially transverse, with support member 12. This allows electrical wire dispenser 10 to hold electrical wire spools on each of rods 50. In this position, each rod 50 may receive electrical wire spools having a flange diameter of from 2 inches to 7 inches, in other embodiments, from 2.5 inches to 6 inches, and in other embodiments, from 3 inches to 3 inches. In other embodiments, all spools may have a flange diameter of 2.125 inches, in other embodiments, 3 inches, in other embodiments, 5 inches, and in other embodiments, 6.5 inches. In one or more embodiments, each rod 50 may receive electrical wire spools having an arbor hole diameter of from 0.5 inches to 2 inches, in other embodiments, from 0.7 inches to 1.5 inches, and in other embodiments, from 0.75 inches to 1.25 inches. In other embodiments, all spools may have an arbor hole diameter of 0.75 inches, in other embodiments, 0.78 inches, in other embodiments, 1 inch, and in other embodiments, 1.25 inches. The above dimensions of the electrical spools flange diameter and arbor hole may be utilized to determine suitable sizing and spacing of rods 50.

Figure 14:
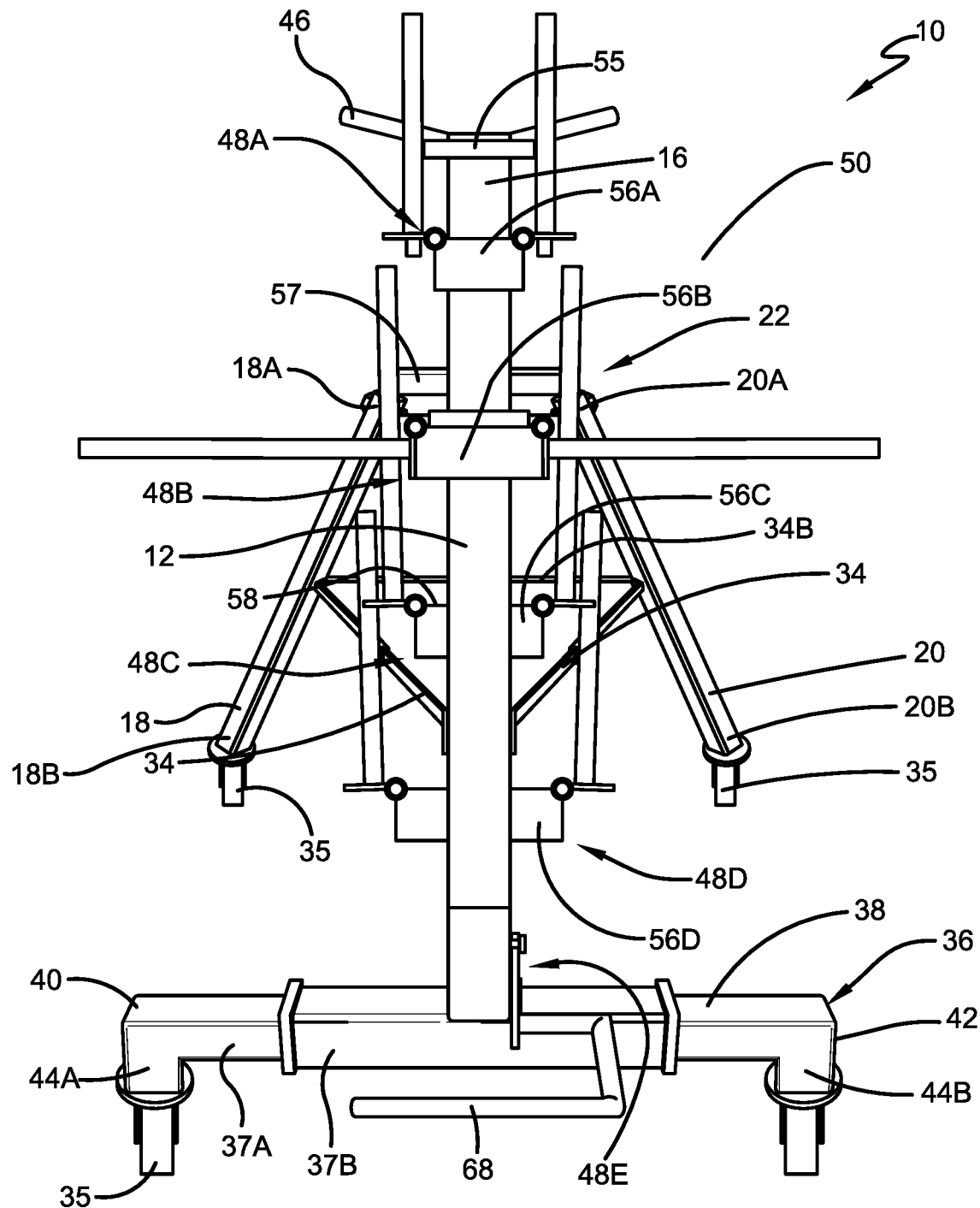
FIG. 14 is a perspective view of the transportable electrical wire dispenser according to the concepts of the present invention, showing a front view of the transportable electrical wire dispenser in an open position, and having some rod assemblies in an open position and some rod assemblies in a closed position, for receiving a larger diameter electrical wire roll.

As shown in FIG. 14, electrical wire dispenser 10 may be positioned such that a portion of rods 50 are parallel, or substantially parallel, with support member 12 and such that a portion of rods 50 are transverse, or substantially transverse, with support member 12. This allows electrical wire dispenser 10 to hold electrical wire rolls of larger diameter than when all of rods 50 are transverse, or substantially transverse, with support member 12. In this position, electrical wire dispenser 10 may receive electrical wire spools having a larger flange diameter than when all rods 50 are transverse, or substantially transverse, with support member 12. Thus, electrical wire dispenser 10 is suitable for dispensing wire from rolls of various sizes. In this position, rods 50 transverse, or substantially transverse, with support member 12 may receive electrical wire spools having a flange diameter of from 6 inches to 42 inches, in other embodiments, from 24 inches to 42 inches, in other embodiments, from 12 inches to 36 inches, and in other embodiments, from 24 inches to 36 inches. In other embodiments, rods 50 transverse, or substantially transverse, with support member 12 may receive electrical wire spools having a flange diameter of 12 inches, in other embodiments, 24 inches, in other embodiments, 36 inches, and in other embodiments, 42 inches. In one or more embodiments, rods 50 transverse, or substantially transverse, with support member 12 may receive electrical wire spools having an arbor hole diameter of from 3 inches to 12 inches, in other embodiments, from 5 inches to 10 inches, and in other embodiments, from 6 inches to 8 inches. In other embodiments, rods 50 transverse, or substantially transverse, with support member 12 may receive electrical wire spools having an arbor hole diameter of 3.5 inches, in other embodiments, 6 inches, in other embodiments, 10 inches, and in other embodiments, 12 inches. The above dimensions of the electrical spools flange diameter and arbor hole may be utilized to determine suitable sizing and spacing of rods 50.

Figure 2:
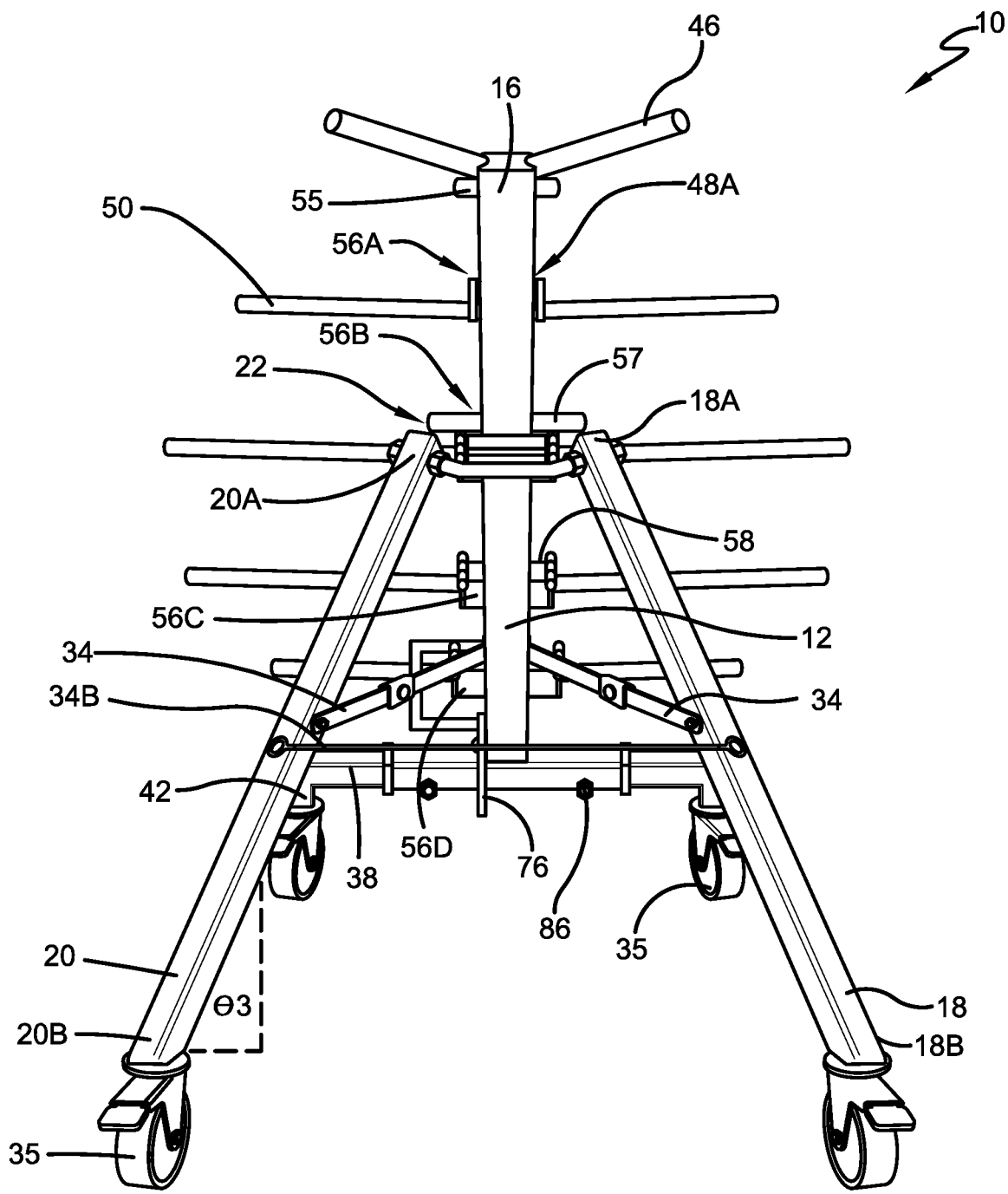
FIG. 2 is a perspective view of the transportable electrical wire dispenser, showing a rear view of the transportable electrical wire dispenser in an open position.
Figure 5:
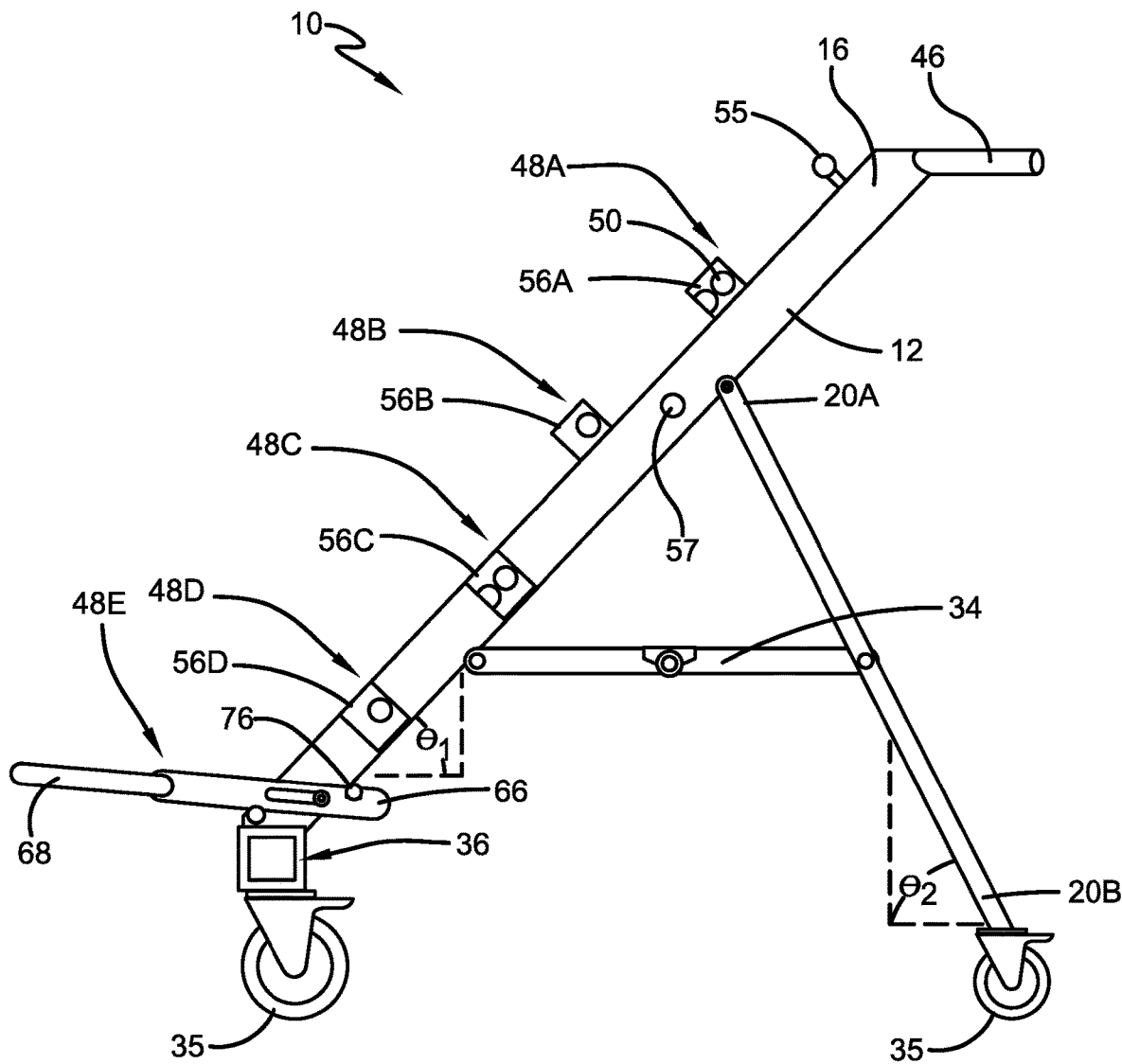
FIG. 5 is a side elevational view of the transportable electrical wire dispenser in an open position.
Figure 6:
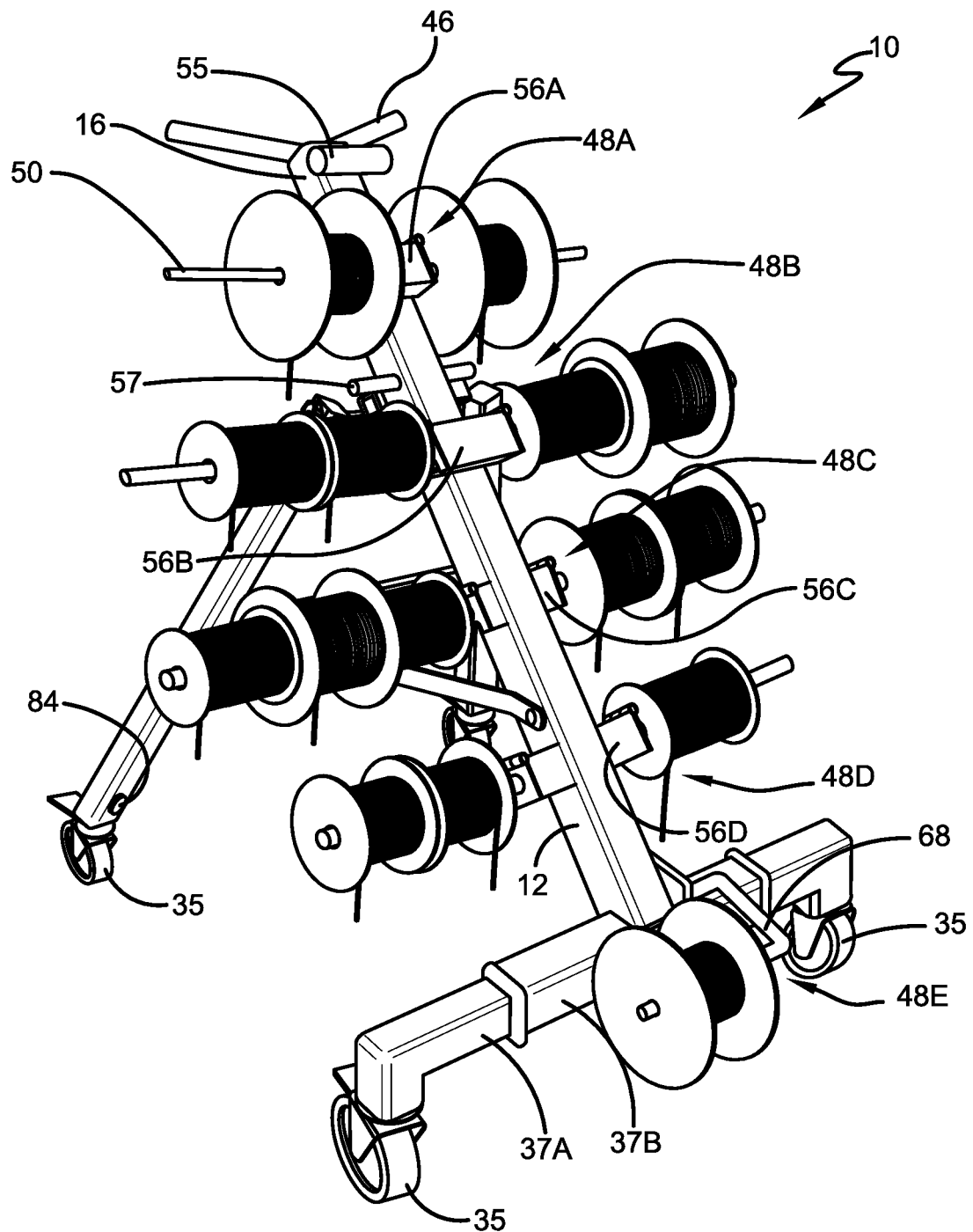
FIG. 6 is a perspective view of the transportable electrical wire dispenser, shown with electrical wire spools in place.

In the expanded position of electrical wire dispenser 10, support member 12, first support leg 18, and second support leg 20 may be characterized by their relative angles. In one or more embodiments, support member 12 may be at an angle with respect to horizontal ($\theta_1$ in FIG. 5) of 50° or approximate thereto, in other embodiments, from 40° to 60°, in other embodiments, from 45° to 55°, in other embodiments, less than 60°, and in other embodiments, less than 55°. In one or more embodiments, first support leg 18 and second support leg 20 may be at an angle with respect to horizontal from a side perspective ($\theta_2$ in FIG. 5) of 65° or approximate thereto, in other embodiments, from 55° to 75°, in other embodiments, from 60° to 70°, in other embodiments, less than 75°, and in other embodiments, less than 70°. In one or more embodiments, first support leg 18 and second support leg 20 may be at an angle with respect to horizontal from a rear/front perspective ($\theta_3$ in FIG. 2) of 65° or approximate thereto, in other embodiments, from 55° to 75°, in other embodiments, from 60° to 70°, in other embodiments, less than 75°, and in other embodiments, less than 70°.

In one or more embodiments, electrical wire dispenser 10 may be sized to fit through a standard door in the expanded position of electrical wire dispenser 10. That is, electrical wire dispenser 10 may be sized in the expanded position such that any dimension corresponding with a dimension transverse the sidewalls of a doorway is less than 36", in other embodiments, less than 34", in other embodiments, less than 32", and in other embodiments, less than 30". Said another way, in one or more embodiments, any horizontal distance of electrical wire dispenser 10 may be less than 36", in other embodiments, less than 34", in other embodiments, less than 32", and in other embodiments, less than 30". These distances may also characterize the distance from the end of one rod 50 to the end of the respective rod 50 forming a line with the first rod 50 when in an open position. These distances may also characterize the distance between first support leg 18 and second support leg 20 when in an open position.

Figure 8:
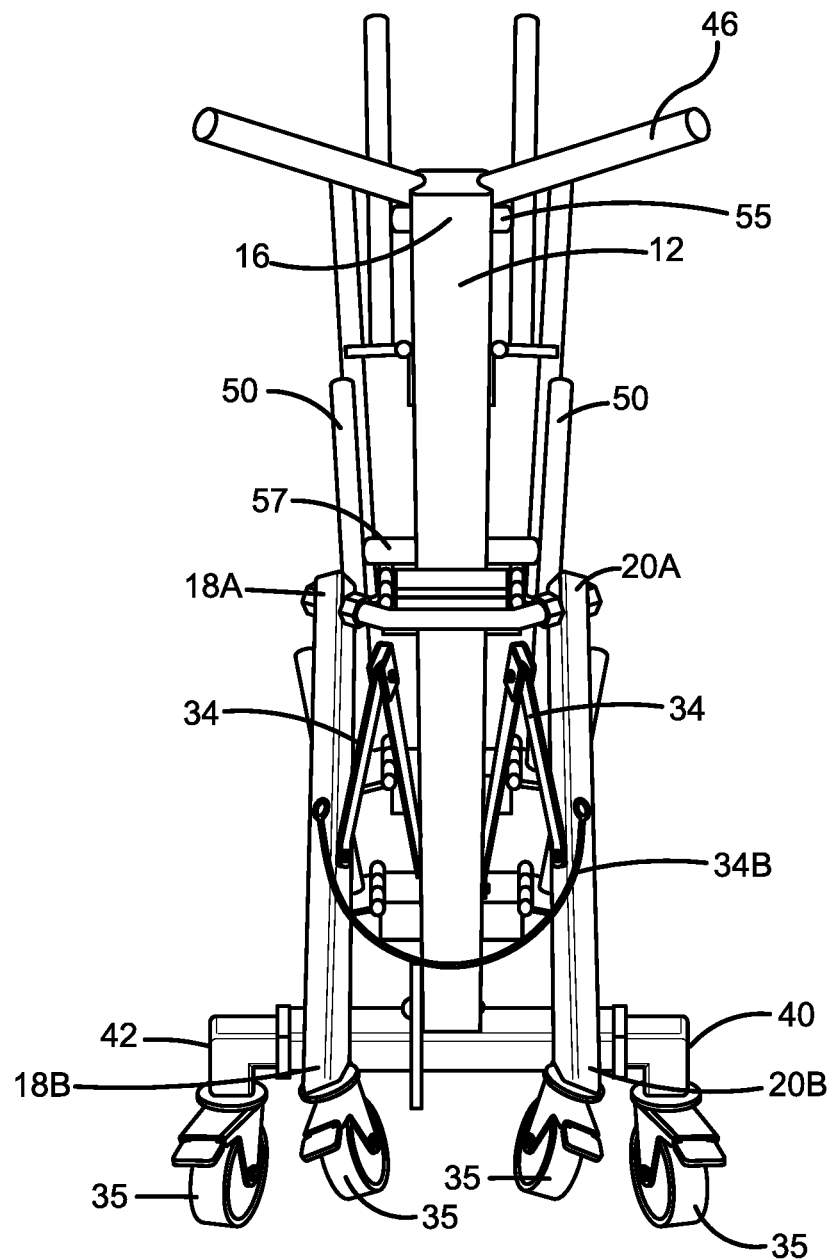
FIG. 8 is a perspective view of the transportable electrical wire, showing a rear view of the transportable electrical wire dispenser in a closed position.

The collapsed position of electrical wire dispenser 10 is shown in FIGS. 7-9. Securement members 34 (e.g. folding brackets) and securement member 34B (e.g. tensioned wire rope) allow a user to move support member 12, first support leg 18, and second support leg 20 from the expanded position to the collapsed position (and vice versa). In the collapsed position of electrical wire dispenser 10, support member 12, first support leg 18, and second support leg 20, are substantially parallel with each other to thereby form the electrical wire dispenser in a more compact shape for easier transporting of electrical wire dispenser 10 from a first location to a second location (though electrical wire dispenser 10 can also be transported from a first location to a second location when in the expanded position).

In the collapsed position of electrical wire dispenser 10, rods 50 may also be in their closed position, which may be described as parallel or substantially parallel with support member 12. As mentioned above, in one or more embodiments, the perimeter of cutout 54, rod securing bar 55, and rod securing bar 57 may be made from a magnetic material or may include one or more magnets for further securement of rods 50 in their closed position.

Figure 11:
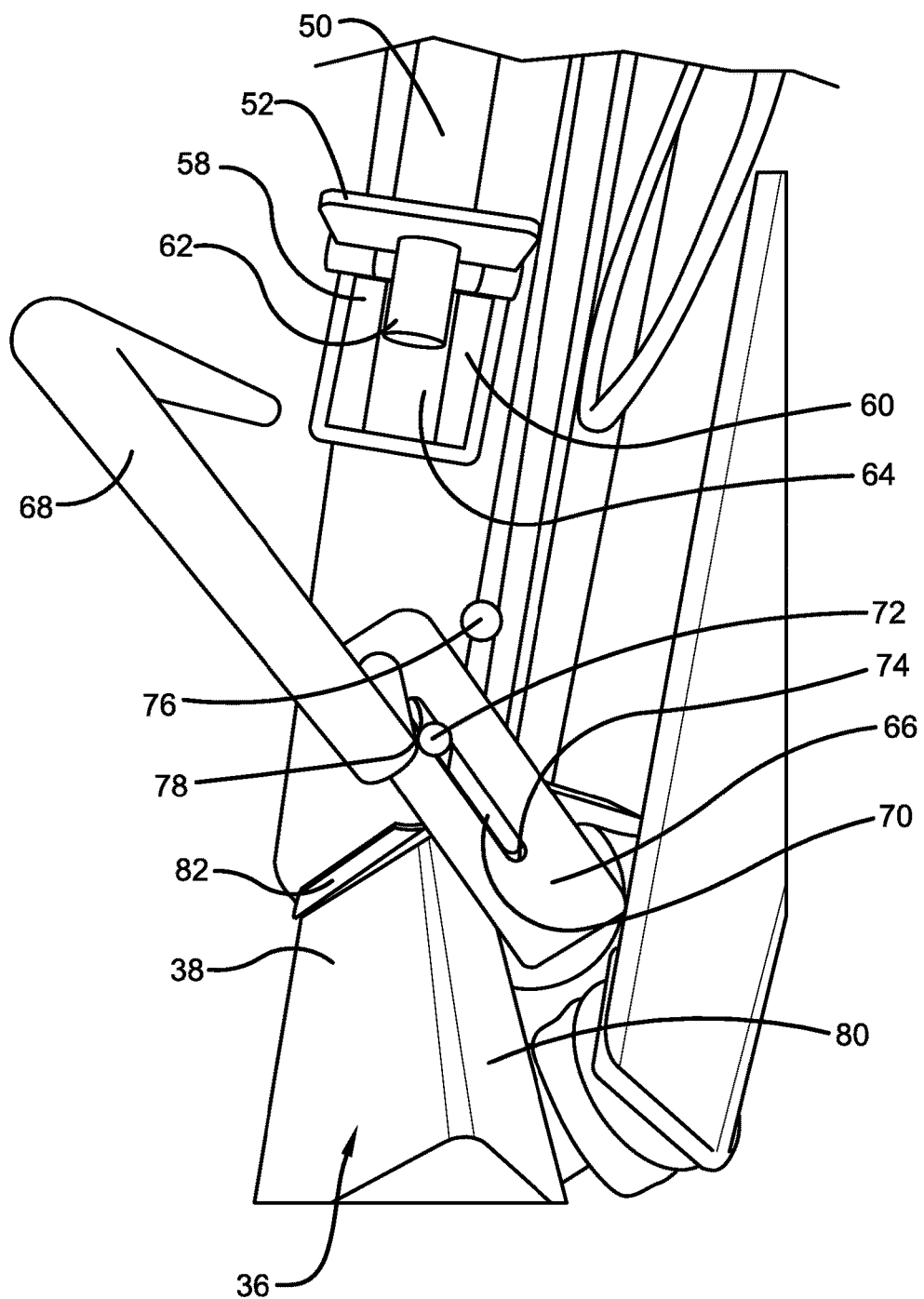
FIG. 11 is a perspective view of the lowest rod assembly of the transportable electrical wire dispenser.

In one or more embodiments, for securing first support leg 18 and second support leg 20 in the collapsed position, first support leg 18 and second support leg 20 may be provided with a magnet 84 that will magnetically couple with a respective magnet 86 of base member 36. In other embodiments, the magnet of first support leg 18 and second support leg 20 may be positioned on the respective caster 35 (FIG. 11). The magnetic coupling prevents movement of first support leg 18 and second support leg 20 to the expanded position until a user overcomes the magnetic force.

Figure 17:
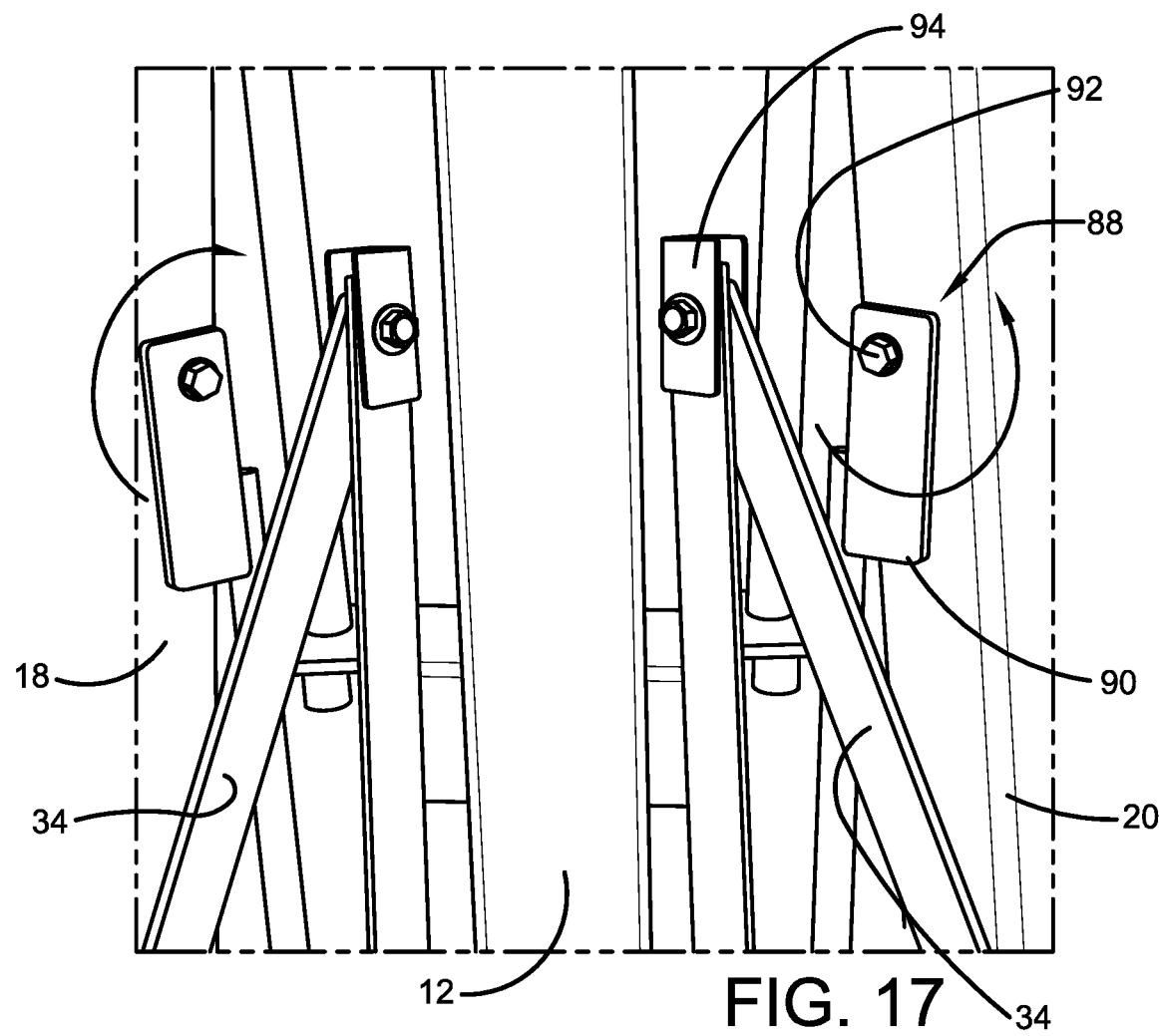
FIG. 17 is a partial perspective view of the locks for securing the support legs in place, showing the unlocked position.
Figure 18:
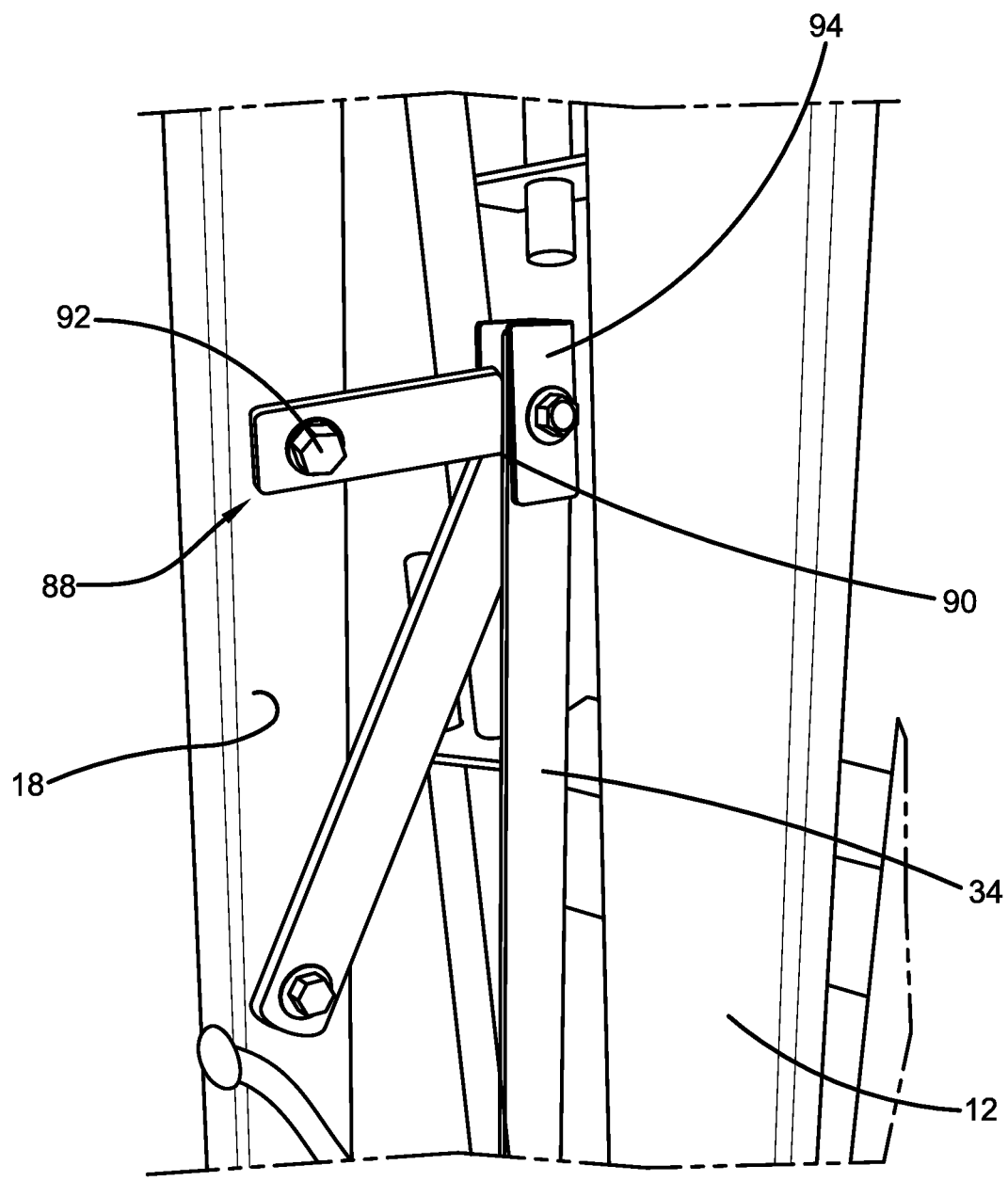
FIG. 18 is a partial perspective view of the lock for securing a support leg in place, showing the locked position.
Figure 19:
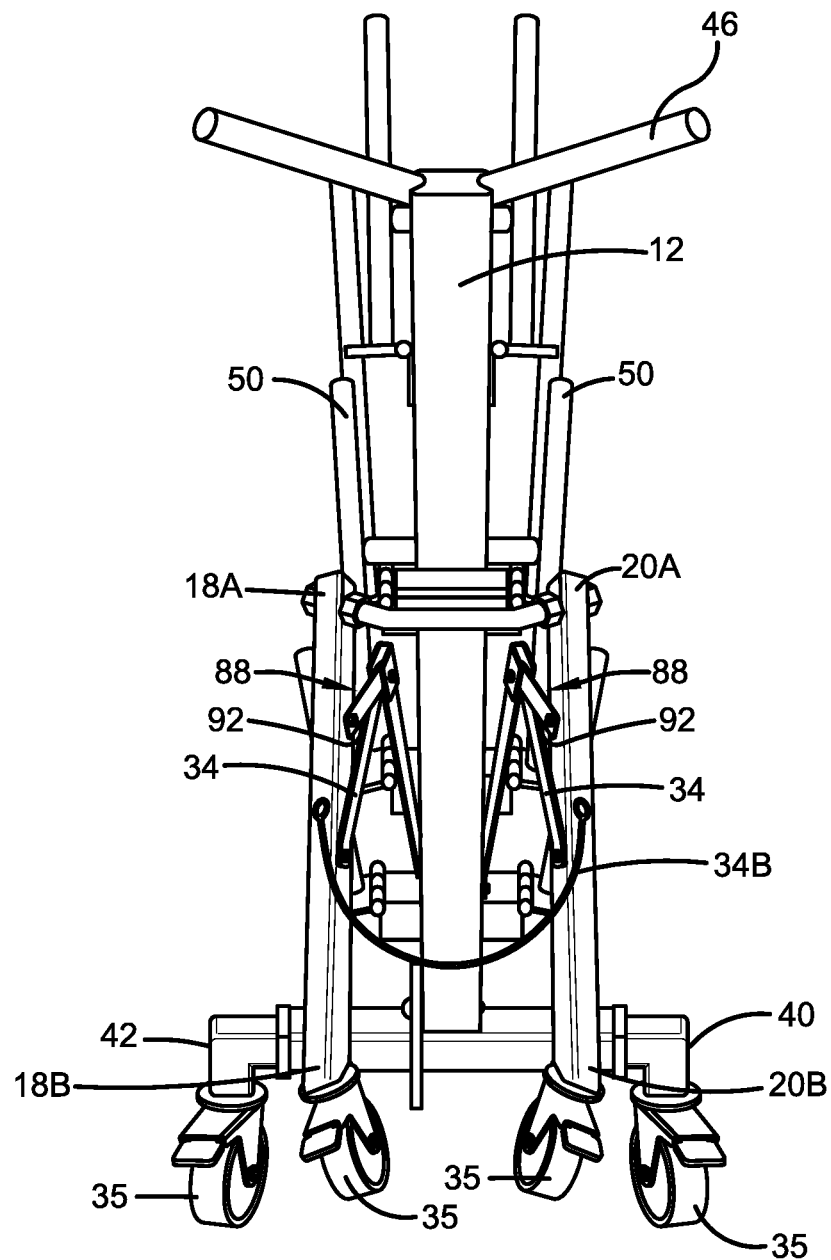
FIG. 19 is a perspective view of the locks for securing the support legs in place, showing the locked position.

In one or more embodiments, for securing first support leg 18 and second support leg 20 in the collapsed position, one or both of first support leg 18 and second support leg 20 may be provided with a locking bar 88 that can forcefully hold first support leg 18 and second support leg 20 in place. Locking bar 88 may have a generally rectangular shape but having a rounded corner 90. Locking bar 88 may be loosely coupled with a respective of first support leg 18 and second support leg 20, such as by a loosely-tightened bolt 92, such that locking bars 88 are rotatable in the directions of the arrows in FIG. 17.

Based on rounded corner 90, locking bars 88 can be rotated until they are securely positioned in contact with a locking member 94 of a respective securement member 34. The rounded corner 90 allows locking bars 88 to travel sufficiently with respect to locking member 94 to thereby prevent first support leg 18 and second support leg 20 from movement, to thereby prevent first support leg 18 and second support leg 20 from traveling to the expanded position. This may be described as the locking position of locking bars 88. To move locking bars 88 back to the unlocked position, locking bars 88 are rotated in the reverse direction to place locking bars 88 back in the position of FIG. 17.

As said above, in the expanded position, electrical wire dispenser 10 may be sized to fit through a standard door, and it should therefore be appreciated that electrical wire dispenser 10 may fit through a standard door in the collapsed position.

As generally known to those skilled in the art, components of electrical wire dispenser 10 may be made be made of any suitable material. Exemplary materials include metal, fiberglass, plastic, and rubber. In one or more embodiments, all components of electrical wire dispenser 10 aside from wheels of casters 36 are metal.

In light of the foregoing, it should be appreciated that the present invention advances the art by providing a transportable electrical wire dispenser. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. An electrical wire dispenser comprising a support member having a first distal end and a second distal end, a base member extending from the first distal end of the support member, the base member having a first distal end, a second distal end, and a bottom surface, a first support member support leg coupled with the support member, a second support member support leg coupled with the support member, and a plurality of rods coupled with the support member,
   wherein when the electrical wire dispenser is in a first expanded position, the support member, the first support member support leg, and the second support member support leg form a tripod shape, and at least a portion of the plurality of rods are substantially transverse with the support member to thereby hold electrical wire spools thereon and dispense electrical wire therefrom,
   wherein when the electrical wire dispenser is in a second collapsed position, the plurality of rods, the first support member support leg, and the second support member support leg are substantially parallel with the support member to thereby form the electrical wire dispenser in a compact shape for more easily transporting the electrical wire dispenser from a first location to a second location.

2. The electrical wire dispenser of claim 1, the first support member support leg having a first distal end coupled with the support member and a second distal end having a caster, the second support member support leg having a first distal end coupled with the support member and a second distal end having a caster, the bottom surface of the base member having a pair of casters.

3. The electrical wire dispenser of claim 2, wherein each of the casters are swivel casters capable of being locked in position, such that when the electrical wire dispenser is in the first expanded position and the casters are locked in position, the electrical wire dispenser is secured in place at a desired location to facilitate dispensing electrical wire without the dispenser moving undesirably.

4. The electrical wire dispenser of claim 2, the bottom surface of the base member having a first base member support leg extending therefrom proximate the first distal end of the base member and a second base member support leg extending therefrom proximate the second distal end of the base member.

5. The electrical wire dispenser of claim 4, the first base member support leg having a first caster of the pair of casters of the bottom surface of the base member, and the second base member support leg having a second caster of the pair of casters of the bottom surface of the base member.

6. The electrical wire dispenser of claim 1, further comprising a first securement member between the first support member support leg and the support member, a second securement member between the second support member support leg and the support member, and a third securement member between the first support member support leg and the second support member support leg.

7. The electrical wire dispenser of claim 6, wherein the first securement member and the second securement member are folding brackets and the third securement member is a tensioned rope.

8. The electrical wire dispenser of claim 1, the second distal end of the support member including a handle extending therefrom.

9. The electrical wire dispenser of claim 1, wherein when the electrical wire dispenser is in the first expanded position, at least a portion of the plurality of rods are substantially parallel with the support member, such that the at least a portion of the plurality of rods that are substantially transverse with the support member are thereby able to hold electrical wire spools having a larger diameter than when each of the plurality of rods are substantially transverse with the support member.

10. The electrical wire dispenser of claim 1, wherein when the electrical wire dispenser is in the first expanded position, all of the plurality of rods are substantially transverse with the support member to thereby hold electrical wire spools on each of the plurality of rods.

11. The electrical wire dispenser of claim 1, the plurality of rods including two pairs of rods provided by a pair of upper rod assemblies.

12. The electrical wire dispenser of claim 11, wherein the pair of upper rod assemblies includes an uppermost rod assembly and a next-upper rod assembly, wherein the uppermost rod assembly includes a pair of brackets each having a cutout, the cutouts retaining the pair of rods of the next-upper rod assembly when the electrical wire dispenser is in the second collapsed position.

13. The electrical wire dispenser of claim 12, the support member including an upper surface, wherein the pair of upper rod assemblies are each spaced from the upper surface of the support member by a respective spacer.

14. The electrical wire dispenser of claim 11, the plurality of rods including two rods provided by a pair of lower rod assemblies.

15. The electrical wire dispenser of claim 1, the plurality of rods including a rod provided by a lowest rod assembly, the lowest rod assembly including a guide bracket coupled with a rod, wherein the guide bracket is adapted to travel the lowest rod assembly between a first position corresponding with the first expanded position of the electrical wire dispenser and a second position corresponding with the second collapsed position of the electrical wire dispenser.

16. The electrical wire dispenser of claim 15, wherein the rod of the lowest rod assembly is U-shaped having one shorter arm particularly coupled with the guide bracket and one longer arm for receiving an electrical wire roll.

17. The electrical wire dispenser of claim 1, at least a portion of the plurality of rods including a tab at a distal end thereof for retaining an electrical spool placed on each of the at least a portion of the plurality of rods when the electrical wire dispenser is in the first expanded position.

18. The electrical wire dispenser of claim 1, wherein any horizontal distance of the electrical wire dispenser is less than 36 inches.

19. The electrical wire dispenser of claim 1, one of the first support member support leg and the second support member support leg including a locking bar rotatable between a first locking position for retaining the electrical wire dispenser in the second collapsed position and a second unlocking position for allowing the electrical wire dispenser to travel between the second collapsed position and the first expanded position.

20. The electrical wire dispenser of claim 19, further comprising a first securement member between the first support member support leg and the support member and a second securement member between the second support member support leg and the support member, wherein the locking bar has a generally rectangular shape with one rounded corner, wherein the rounded corner contacts a respective one of the first securement member and the second securement member for retaining the electrical wire dispenser in the second collapsed position.

* * * * *